United States Patent [19]
Akashi

[11] Patent Number: 5,576,796
[45] Date of Patent: Nov. 19, 1996

[54] OPTICAL APPARATUS HAVING FUNCTION TO DETECT VISUAL AXIS

[75] Inventor: Akira Akashi, Yokohama, Japan

[73] Assignee: Canon Kabushiki Kaisha, Tokyo, Japan

[21] Appl. No.: 348,226

[22] Filed: Nov. 28, 1994

[30] Foreign Application Priority Data

Nov. 30, 1993 [JP] Japan .................................. 5-323322

[51] Int. Cl.$^6$ ...................................................... G03B 13/00
[52] U.S. Cl. ............................................................... 396/51
[58] Field of Search ................................. 354/400–409, 354/62, 219, 475, 410

[56] References Cited

U.S. PATENT DOCUMENTS

| | | | |
|---|---|---|---|
| 4,572,643 | 2/1986 | Akashi | 354/409 |
| 4,618,236 | 10/1986 | Akashi et al. | 354/406 |
| 4,634,255 | 1/1987 | Suda et al. | 354/406 |
| 4,643,557 | 2/1987 | Ishizaki et al. | 354/406 |
| 4,670,645 | 6/1987 | Ohtaka et al. | 250/201 |
| 4,688,920 | 8/1987 | Suda et al. | 354/406 |
| 4,705,380 | 11/1987 | Yamamoto et al. | 354/402 |
| 4,709,138 | 11/1987 | Suda et al. | 250/201 |
| 4,716,282 | 12/1987 | Akashi et al. | 250/201 |
| 4,728,785 | 3/1988 | Ohnuki et al. | 250/201 |
| 4,739,157 | 4/1988 | Akashi et al. | 250/201 |
| 4,786,932 | 11/1988 | Akashi | 354/402 |
| 4,792,668 | 12/1988 | Akashi et al. | 250/201 |
| 4,792,669 | 12/1988 | Ohnuki et al. | 250/201 |
| 4,792,819 | 12/1988 | Akashi | 354/400 |
| 4,792,821 | 12/1988 | Akashi | 354/402 |
| 4,800,261 | 1/1989 | Akashi | 250/204 |
| 4,800,410 | 1/1989 | Akashi et al. | 354/408 |
| 4,801,962 | 1/1989 | Akashi | 354/402 |
| 4,812,869 | 3/1989 | Akashi et al. | 354/408 |
| 4,825,238 | 4/1989 | Akashi | 354/402 |
| 4,825,239 | 4/1989 | Suda et al. | 354/402 |
| 4,833,313 | 5/1989 | Akashi et al. | 250/201 |
| 4,845,521 | 7/1989 | Akashi | 354/400 |
| 4,855,776 | 8/1989 | Akashi | 354/402 |
| 4,859,842 | 8/1989 | Suda et al. | 250/201 |
| 4,908,645 | 3/1990 | Higashihara et al. | 354/402 |
| 4,952,963 | 8/1990 | Akashi | 354/402 |
| 4,967,225 | 10/1990 | Akashi | 354/402 |
| 4,969,003 | 11/1990 | Ohnuki et al. | 354/402 |
| 4,972,221 | 11/1990 | Ohnuki et al. | 354/402 |
| 4,974,002 | 11/1990 | Ohnuki et al. | 354/400 |
| 4,974,003 | 11/1990 | Ohnuki et al. | 354/400 |
| 4,980,716 | 12/1990 | Suzuki et al. | 354/403 |
| 5,005,037 | 4/1991 | Akashi et al. | 354/400 |
| 5,036,347 | 7/1991 | Tsunekawa et al. | 354/400 |
| 5,060,002 | 10/1991 | Ohnuki et al. | 354/402 |
| 5,061,951 | 10/1991 | Higashihara et al. | 354/400 |
| 5,061,953 | 10/1991 | Higashihara et al. | 354/402 |
| 5,079,581 | 1/1992 | Kadohara et al. | 354/400 |
| 5,081,479 | 1/1992 | Kadohara et al. | 354/402 |
| 5,089,843 | 2/1992 | Higashihara et al. | 354/402 |
| 5,126,777 | 6/1992 | Akashi et al. | 354/402 |
| 5,151,732 | 9/1992 | Akashi et al. | 354/402 |
| 5,182,443 | 1/1993 | Suda et al. | 250/201.2 |
| 5,189,465 | 2/1993 | Akashi et al. | 354/408 |
| 5,194,888 | 3/1993 | Akashi et al. | 354/402 |
| 5,214,466 | 5/1993 | Nagano et al. | 354/402 |
| 5,225,862 | 7/1993 | Nagano et al. | 354/62 |

(List continued on next page.)

FOREIGN PATENT DOCUMENTS 1-274736  11/1989  Japan .

*Primary Examiner*—David M. Gray
*Attorney, Agent, or Firm*—Fitzpatrick, Cella, Harper & Scinto

[57] ABSTRACT

The present invention relates to an optical apparatus, which comprises a photoelectric conversion device for converting reflected light from an eye into an electric signal, and a calculating device for calculating a direction of a visual axis of the eye using the electric signal and correction data, wherein the calculating device obtains the correction data using an electric signal obtained from the photoelectric conversion device when the eye keeps directed to a specific portion in the field of view during an ordinary operation of the optical apparatus.

6 Claims, 8 Drawing Sheets

U.S. PATENT DOCUMENTS

| | | | |
|---|---|---|---|
| 5,241,167 | 8/1993 | Suzuki et al. | 250/201.8 |
| 5,245,371 | 9/1993 | Nagano et al. | 354/62 |
| 5,253,008 | 10/1993 | Konishi et al. | 354/402 |
| 5,280,312 | 1/1994 | Yamada et al. | 351/211 |
| 5,293,194 | 3/1994 | Akashi | 354/402 |
| 5,298,927 | 3/1994 | Konishi et al. | 351/211 |
| 5,311,241 | 5/1994 | Akashi et al. | 354/402 |
| 5,333,028 | 7/1994 | Akashi et al. | 354/402 |
| 5,367,153 | 11/1994 | Suda et al. | 250/201.8 |
| 5,381,206 | 1/1995 | Akashi et al. | 354/402 |
| 5,386,258 | 1/1995 | Nagano | 354/400 |
| 5,486,892 | 1/1996 | Suzuki et al. | 354/402 |

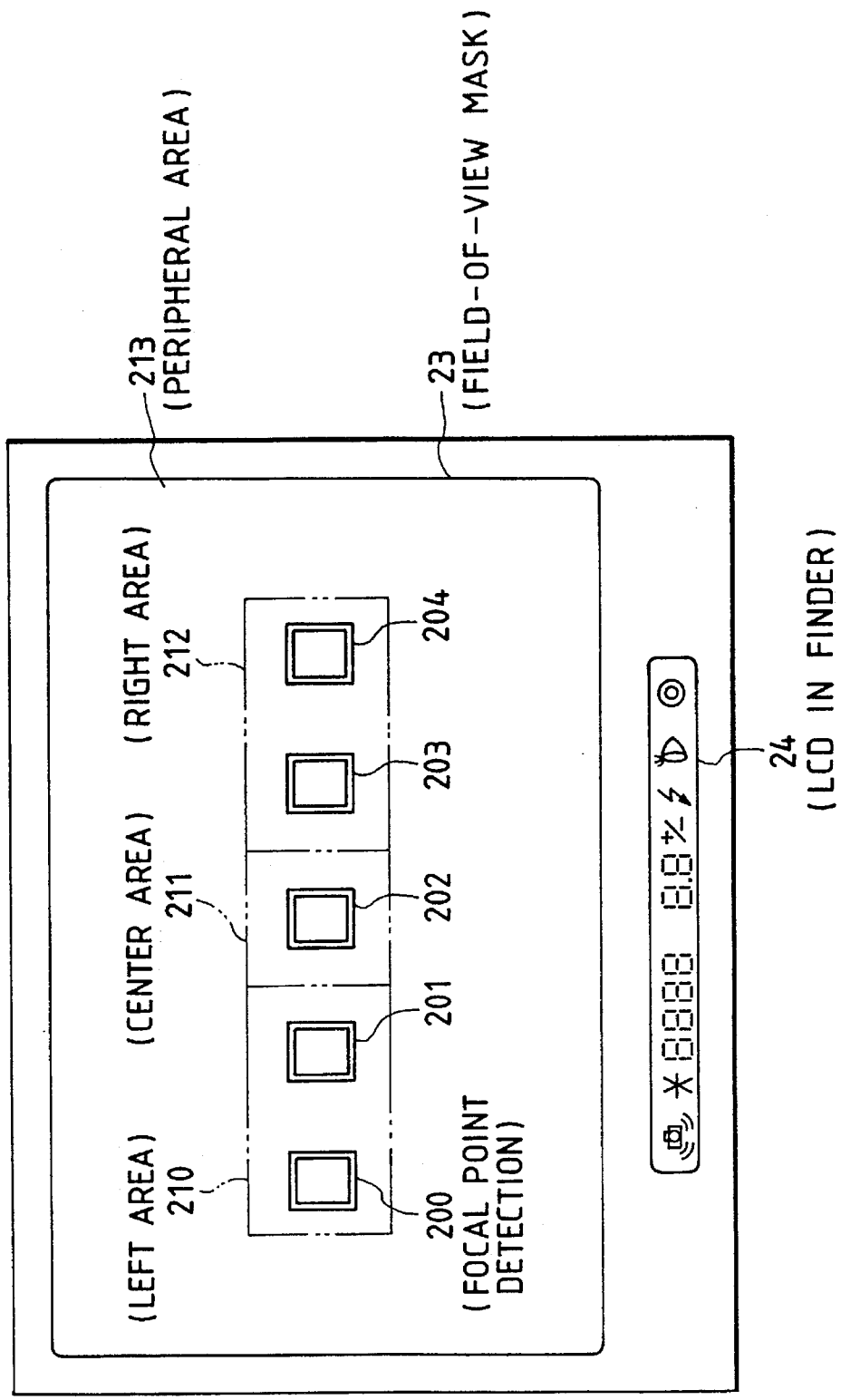

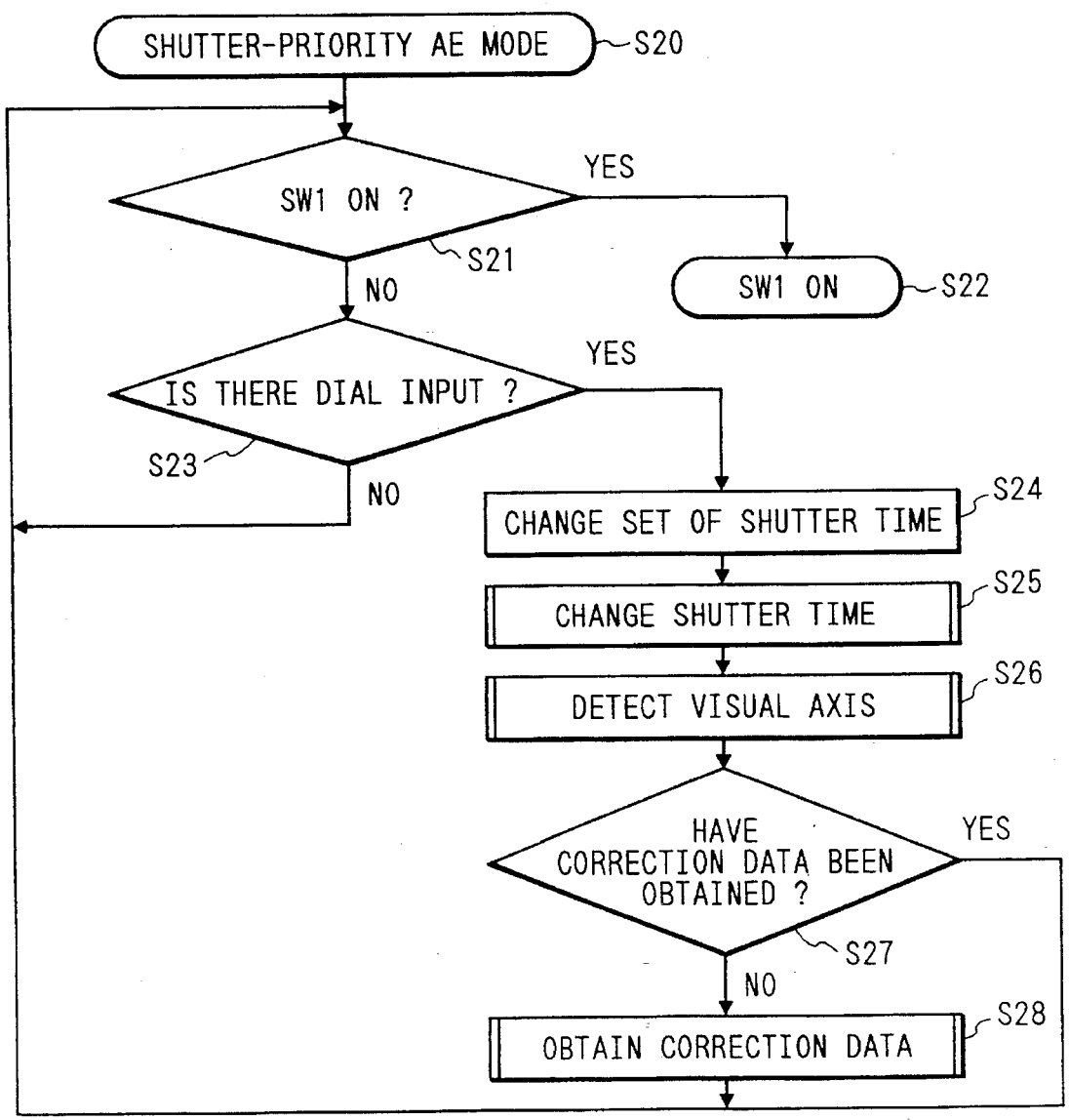

OPTICAL APPARATUS HAVING FUNCTION TO DETECT VISUAL AXIS

BACKGROUND OF THE INVENTION

1. Field of the Invention

The present invention relates to an improvement in optical instruments having a function to detect a visual axis, such as cameras, which calculate information on the user's visual axis from information on a rotational angle of the eyeball and stored parameters and which use this visual-axis information, for example, for selection of a focus-detecting point.

2. Related Background Art

There are provided a variety of conventional apparatus for detecting where a user is observing on an observation plane, i.e., for detecting the so-called line of sight (visual axis) (for example, eye cameras).

For example, Japanese Laid-open Patent Application No. 1-274736 discloses such technology that parallel beams from a light source are projected onto a front eye part of the user's eyeball and that the visual axis is obtained by utilizing positions of a corneal reflection image by reflected light from the cornea and an image of the pupil.

FIG. 1 is a drawing to illustrate the principle of the method for detecting the visual axis.

FIG. 2A shows an ordinary eyeball image projected on a surface of an image sensor 14 in FIG. 1, and numeral 60 in FIG. 2B indicates an image signal output along the line (E)–(E') in FIG. 2A.

In FIG. 2A, reference numeral 50 shows the white portion of the eye, 51 the pupil, and 52a, 52b corneal reflection images of light sources for illuminating the eyeball.

The visual-axis detecting method is described below using these FIG. 1 and FIGS. 2A, 2B.

Infrared light emitting diodes 13a, 13b are arranged nearly in symmetry with each other in the x direction with respect to the optical axis u of a light-receiving lens 12, each divergently illuminating the user's eyeball.

Infrared light emitted from the infrared light emitting diode 13b illuminates a cornea 16 of eyeball 15. On this occasion, a corneal reflection image d by part of infrared light reflected on the surface of the cornea 16 is condensed by the light-receiving lens 12 to be re-imaged at a position d' on the image sensor 14.

Similarly, infrared light emitted from the infrared light emitting diode 13a illuminates the cornea 16 of eyeball 15. On this occasion, a corneal reflection image e by part of infrared light reflected by the surface of the cornea 16 is condensed by the light-receiving lens 12 to be re-imaged at a position e' on the image sensor 14.

Also, beams from the edges a, b of the iris 17 are focused by the light-receiving lens 12 to form respective images of the edges a, b at unrepresented positions a', b' on the image sensor 14. Whenever the rotational angle θ of an optical axis v of the eyeball 15 relative to the optical axis u of the light-receiving lens 12 is small, letting xa and xb be x coordinates of the edges a, b of the iris 17, a coordinate position xc of the center position c of the pupil 19 is expressed as follows.

$$xc \simeq (xa+xb)/2$$

Since the x coordinate of the middle point between the corneal reflection images d and e is coincident with the x coordinate xo of the center of curvature o of the cornea 16, the rotational angle θ of the optical axis v of the eyeball 15 approximately satisfies the following relation of formula (1):

$$(A1*L_{oc})*\sin\theta \simeq xc-(xd+xe)/2 \quad (1)$$

where xd, xe are x coordinates of originating positions of the corneal reflection images d, e, respectively, $L_{oc}$ is a standard distance between the center of curvature o of the cornea 16 and the center c of the pupil 19, and A1 is a coefficient taking individual variations in distance $L_{oc}$ into account. Thus, a visual-axis processing unit can obtain the rotational angle θ of the optical axis v of the eyeball 15 by detecting positions of the characteristic points (corneal reflection images d, e and edges a, b of the iris 17) projected on part of image sensor 14. In this case, the above formula (1) can be rewritten as follows.

$$\beta(A1*L_{oc})*\sin\theta \simeq (xa'+xb')/2-(xd'+xe')/2 \quad (2)$$

Here, β is a magnification determined by the position of the eyeball 15 relative to the light-receiving lens 12, which is obtained substantially as a function of a distance |xd'−xe'| between the corneal reflection images of the infrared light emitting diodes 13a, 13b. The rotational angle θ of the optical axis v of the eyeball 15 can be rewritten as follows.

$$\theta \simeq \text{ARCSIN}\{(xc'-xf')/\beta/(A1*L_{oc})\} \quad (3)$$

Here, $$xc' \simeq (xa'+xb')/2$$

$$xf' \simeq (xd'+xe')/2.$$

Incidentally, the visual axis of the user's eyeball 15 does not coincide with the optical axis v in many cases, and, therefore, once the horizontal rotational angle θ of the optical axis v is calculated, the horizontal visual axis θH of the user can be obtained by performing correction of angle δ between the optical axis v and the visual axis. Letting B1 be a coefficient taking into account individual variations in correction angle δ between the optical axis v and the visual axis of the eyeball 15, the horizontal visual axis θH of the user can be obtained as follows.

$$\theta H = \theta \pm (B1*\delta) \quad (4)$$

Here, when clockwise rotation with respect to the user is defined as positive, the signs ± are determined in such a manner that the sign is + when the user's eye looking into the observation apparatus is the left eye and − when it is the right eye.

FIG. 1 shows an example where the user's eye rotates in the z-x plane (for example, the horizontal plane). Also, the visual axis can similarly be detected when the user's eye rotates in the z-y plane (for example, the vertical plane). It should be, however, noted that the vertical visual axis θV is given as follows because the vertical component of the user's visual axis coincides with the vertical component θ' of the optical axis v of the eyeball 15, $$\theta V = \theta'$$

Further, from the visual axis data θH, θV, the following gives positions (xn, yn) on a focusing screen in the finder view field observed by the user.

$$xn = m*\theta H \quad (5)$$
$$= m*[\text{ARCSIN}\{(xc' - xf)/\beta/(A1*L_{oc})\} \pm (B*\delta)]$$
$$yn = m*\theta V$$

Here, m is a constant determined by the finder optical system in camera.

Here, the values of coefficients A1, B1 for correcting the individual variations of user's (photographer's) eyeball 15 are obtained in such a manner that, while keeping the user's eye fixed on a target provided at a predetermined position in the finder of camera, the values are obtained so as to make a position of a fixation point calculated according to the above formula (5) coincident with the position of the target.

This operation for attaining the coefficients A1, B1 for correcting the individual variations for each user as described above will be called as "calibration."

FIG. 3 shows an indication in the finder, in which 200 to 204 represent focus-detecting areas (distance-measuring points), 210, 211, 212 photometry areas in the finder, i.e., left area, center area, and right area, and 213 a peripheral area. Further, 23 denotes a field-of-view mask, and 24 an in-finder LCD (Liquid Crystal Display), which is a display portion for displaying various information (shutter time, etc.) of camera.

Here is described the above "calibration" operation, using FIG. 3.

First keeping the user's eye fixed at the rightmost end focus-detecting area 204, signals of an image of the user's eye at this moment are obtained to calculate the rotational angle of the eyeball thereby and then to store it. Next keeping the user's eye fixed at the left most end focus-detecting area 200, the rotational angle of the eyeball at this moment is similarly calculated and the calculated angle is stored. Since x, y coordinates of the respective focus-detecting areas 204, 200 on the finder are known, the two unknowns A1, B1 are calculated using the formula (5) from the two observation information.

Normally, the cameras having the visual-axis detecting apparatus have an independent mode called a "calibration mode," and the user is requested to execute the "calibration" in this mode, prior to execution of the visual axis detection.

Although the correction coefficients characteristic of each user can be attained simply by executing the above "calibration" operation, this arrangement requires new "calibration" for every change of user, which forces the user to perform such an extremely troublesome operation.

SUMMARY OF THE INVENTION

An object of the present invention is to provide an optical apparatus with a function to detect the visual axis which can perform excellent visual axis detection without forcing the user to perform a troublesome operation.

A first optical apparatus of the present invention includes a photoelectric converter for converting reflected light from an eye into an electric signal; and a detector for detecting a direction of a visual axis of the eye using the electric signal and a parameter. The detector obtains the parameter using an electric signal obtained from the photoelectric converter when the eye keeps directed to a specific portion in a field of view during an ordinary operation of the optical apparatus.

A second optical apparatus of the present invention includes a photoelectric converter for converting reflected light from an eye into an electric signal and a calculator for calculating a direction of a visual axis of the eye using the electric signal and correction data, wherein the a calculator obtains the correction data using an electric signal obtained from the photoelectric converter when the eye is kept on a specific portion in a field of view during an ordinary operation of the optical apparatus.

A photo-taking apparatus of the present invention includes a viewfinder; a photoelectric converter for converting reflected light from an eye into an electric signal; and a calculator for calculating a direction of a visual axis of the eye using said electric signal and individual data, wherein the calculator obtains the individual data using an electric signal obtained from the photoelectric converter when said eye is kept on a specific portion in a field of view of the finder during an ordinary operation for shooting.

BRIEF DESCRIPTION OF THE DRAWINGS

FIG. 3 is a drawing to illustrate the layout inside the field of view of the finder in camera;

FIG. 9 is a flowchart to show the operation of the main part in the second embodiment of the present invention.

DETAILED DESCRIPTION OF THE PREFERRED EMBODIMENTS

The present invention will be described in detail, based on the accompanying drawings.

Figure 1:
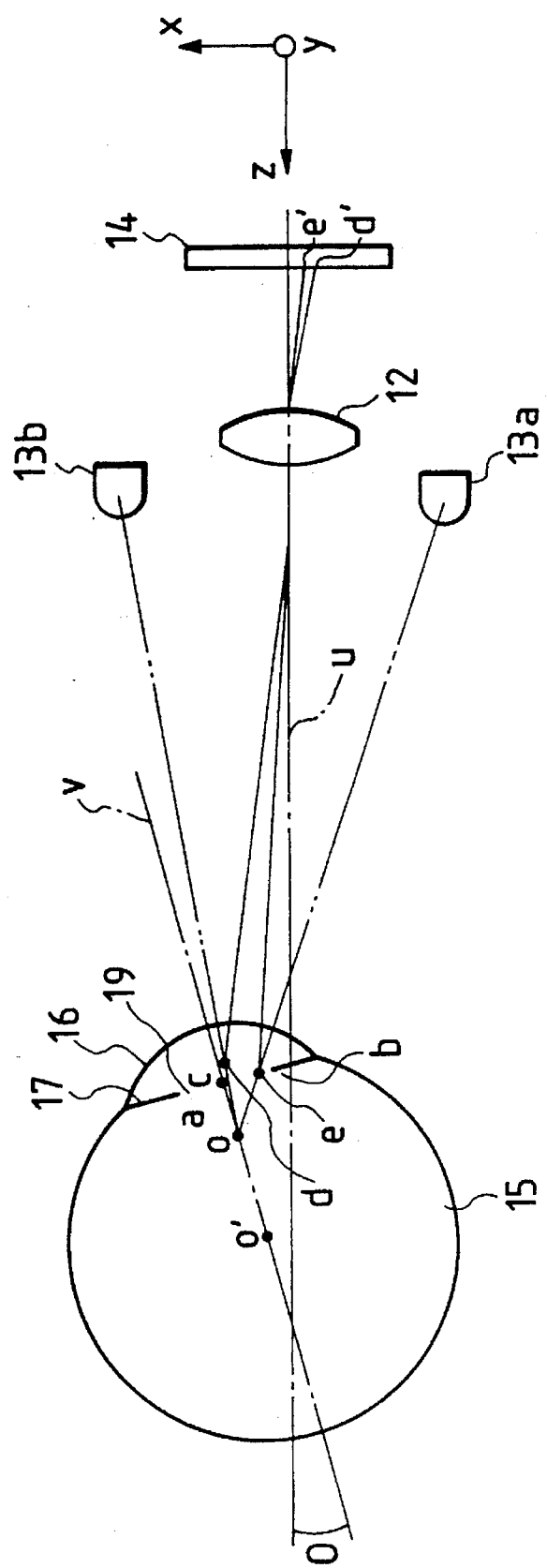
FIG. 1 is a drawing to illustrate a general method for detecting the visual axis.
Figure 2A:
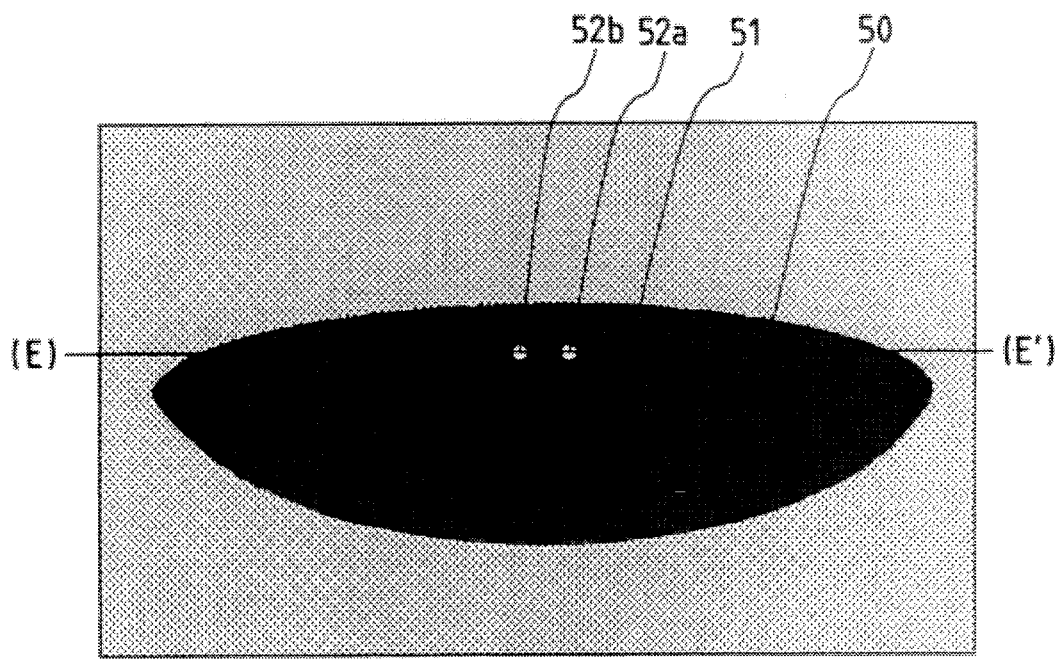
FIG. 2A is a drawing to show an image of the eyeball in detecting the visual axis by the method of FIG. 1.
Figure 2B:
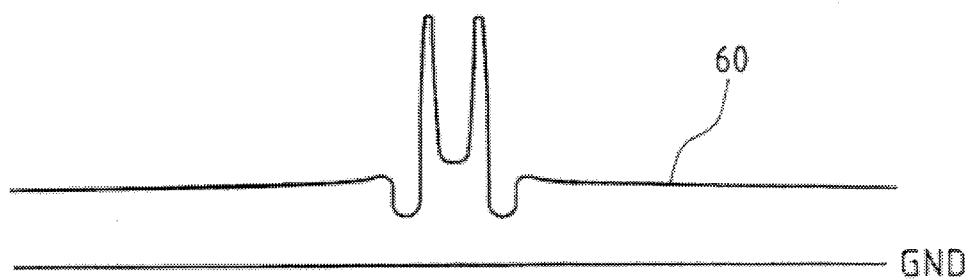
FIG. 2B is a drawing to show an example of a signal from the image of the eyeball in detecting the visual axis by the method of FIG. 1.
Figure 4:
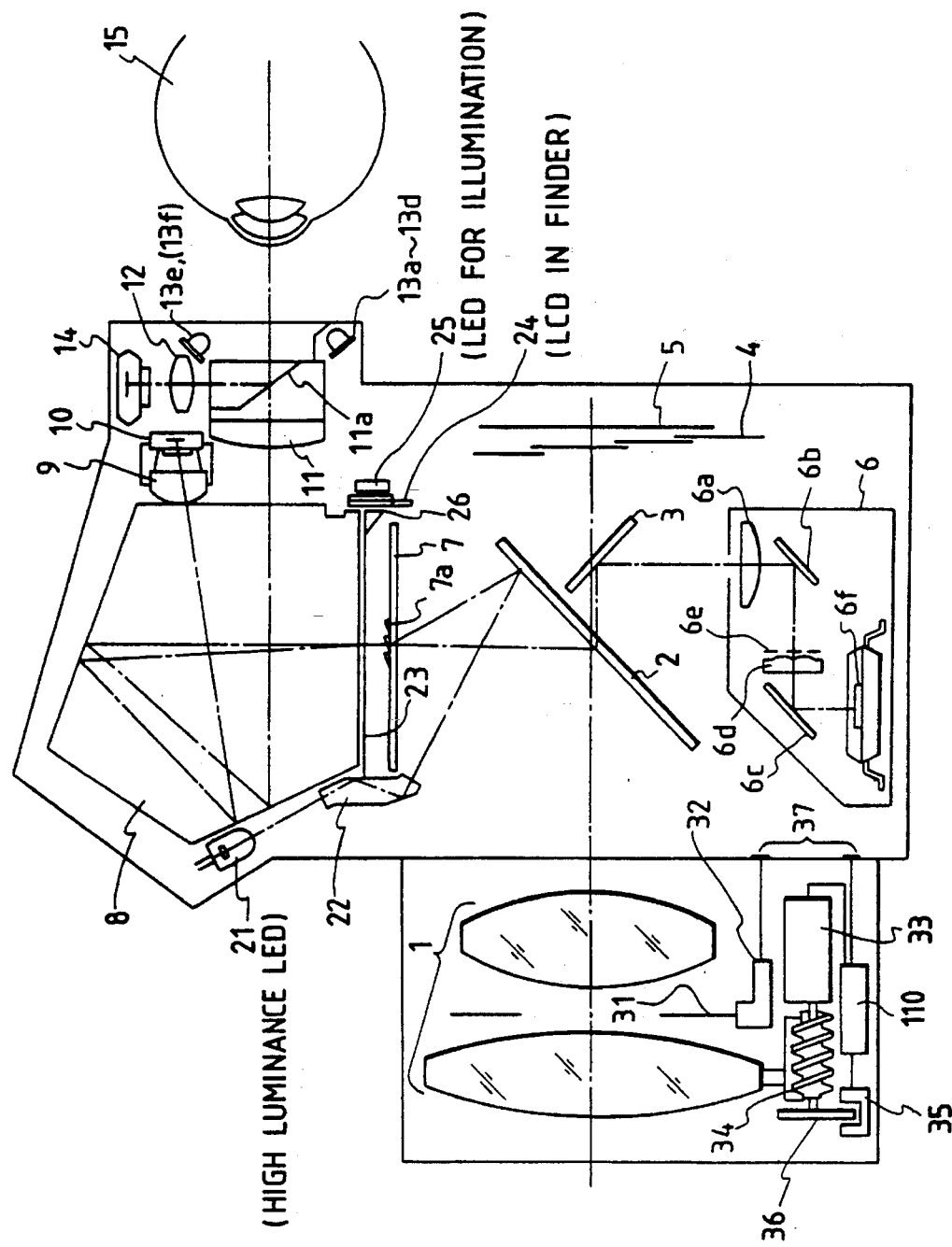
FIG. 4 is a schematic structural drawing to show the first embodiment where the present invention is applied to a single-lens reflex camera.

FIG. 4 is a schematic drawing of major part to show the first embodiment where the present invention is applied to a single-lens reflex camera.

In FIG. 4, reference numeral 1 designates a taking lens, which is represented by two lenses for the sake of convenience but is composed of several lenses in fact. Numeral 2 denotes a main mirror, which is arranged to be inclined in the photo-taking optical path or withdrawn from the photo-taking optical path, depending upon whether observation of an image of an object through a finder system or shooting of the image of the object. Numeral 3 is a submirror, which reflects a beam having passed through the main mirror 2 toward a focus-detecting apparatus 6, as detailed below, set in the lower part in the camera body.

Numeral 4 denotes a shutter, and 5 a photosensitive member, which is a silver-salt film, a CCD or MOS solid state imaging device, or an image pick-up tube such as a vidicon.

Numeral 6 is the focus-detecting apparatus, which is composed of a field lens 6a located in the vicinity of the image plane of the taking lens 1, reflective mirrors 6b and 6c, a secondary imaging lens 6d, a stop 6e, a line sensor 6f consisting of a plurality of CCDs, etc.

The focus-detecting apparatus 6 in the present embodiment performs focusing point detection by the well-known phase difference method and is so arranged that it can detect the focusing point for each of a plurality of focus-detecting areas (five portions) in the observing screen (or in the finder view field), as shown in FIG. 3.

Numeral 7 denotes a focusing screen located on an intended image plane of the taking lens 1, 8 a pentagonal prism for changing the finder optical path, and 9, 10 an imaging lens and a photometry sensor, respectively, for measuring the luminance of an object in the observing screen. The imaging lens 9 establishes a conjugate relation between the focusing screen 7 and the photometry sensor 10 through reflective surfaces in the pentagonal prism 8.

An eyepiece lens 11 having a beamsplitter 11a is set behind the light exit portion of the pentagonal prism 8, and the lens 11 is used when the user's eye 15 observes the focusing screen 7. The beamsplitter 11a is constructed of a dichroic mirror, for example, which transmits the visible light but reflects the infrared light.

Numeral 12 denotes a light-receiving lens, and 14 an image sensor consisting of a two-dimensional array of photoelectric conversion elements such as CCD's, which is arranged to be conjugate with the vicinity of the pupil of the user's eyeball 15 with respect to the light-receiving lens 12. Further, 13a to 13f are infrared light emitting diodes each being an illumination light source.

Numeral 21 designates a high-luminance LED for superimposition, which is visible even in a bright object. Light emitted from LED 21 is guided through a projection prism 22, is reflected by the main mirror 2, is bent in the direction perpendicular to the focusing screen 7 (in the direction of the optical axis) by a fine prism array 7a provided on a display portion of the focusing screen 7, and then passes through the pentagonal prism 8 and the eyepiece lens 11 to reach the user's eye 15.

The fine prism array 7a is formed in the shape of frame at each of plural positions (focus-detecting areas) corresponding to the focus-detecting areas in the focusing screen 7, and each area is illuminated by a corresponding LED of the five LEDs 21 for superimposition (which are referred to as LED-L1, LED-L2, LED-C, LED-R1, LED-R2).

As seen from the field of view in the finder shown in FIG. 3, this arrangement causes each focus-detecting area 200, 201, 202, 203, 204 to shine in the finder view field, thereby indicating a focus-detecting area (which is hereinafter called superimposing indication).

Numeral 23 denotes a field mask for defining the region of the finder view field, and 24 an in-finder LCD (Liquid Crystal Display) for indicating photographic information outside the finder view field, which is illuminated by an LED for illumination (F-LED) 25.

Light having passed through the above in-finder LCD 24 is directed toward the user's eye by a triangular prism 26, whereby the user can visually recognize a variety of photographic information, as shown in FIG. 3.

Numeral 31 is a stop set in the taking lens 1, 32 a stop drive apparatus including a stop drive circuit 111 as described below, 33 a lens driving motor, and 34 a lens drive member consisting of a drive gear and other components.

Numeral 35 denotes a photo coupler, which detects rotation of a pulse plate 36 synchronized with the lens drive member 34 and transmits an amount of movement of lens to a lens focusing circuit 110. The focusing circuit 110 is arranged to drive the lens driving motor 33 by a predetermined amount based on the information of the lens drive amount from the camera and the information from the photo coupler 35, so as to move the taking lens 1 to the in-focus position. Numeral 37 designates well-known mount contacts as an interface between the camera and the lens.

Figure 5:
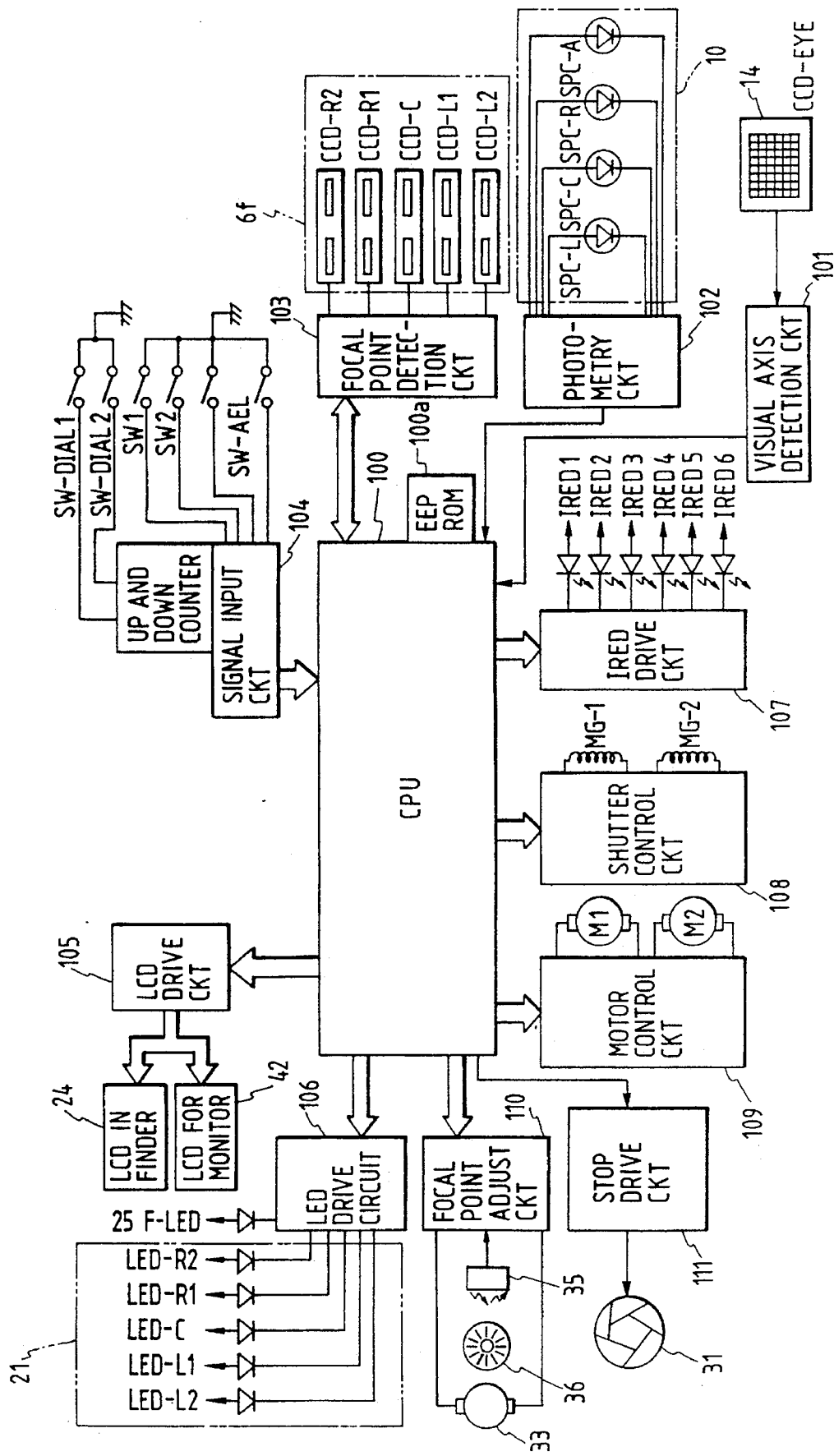
FIG. 5 is a block diagram to show the electric arrangement in the single-lens reflex camera of FIG. 4.

FIG. 5 is a diagram of built-in electric circuits in the single-lens reflex camera as so arranged, in which the same components are denoted by the same reference numerals as those in FIG. 4.

Connected to a microcomputer (hereinafter referred to as CPU) 100 built in the camera body are a visual axis detection circuit 101, a photometry circuit 102, an automatic focusing point detection circuit 103, a signal input circuit 104, an LCD drive circuit 105, an LED drive circuit 106, an IRED drive circuit 107, a shutter control circuit 108, and a motor control circuit 109. Signals are transmitted through the mount contacts 37 shown in FIG. 4 between the CPU 100 and the focusing circuit 110 and the stop drive circuit 111 set in the taking lens 1.

EEPROM 100a attached to CPU 100 has a function to store visual-axis correction data for correcting individual variations of the visual axis, as storing means.

The visual axis detection circuit 101 converts analog signals of an eyeball image from the image sensor 14 (CCD-EYE) into digital signals and transfers the image information of digital signals to CPU 100. The CPU 100 extracts the characteristic points of the eyeball image necessary for detection of the visual axis in accordance with a predetermined algorithm, as described later, and further calculates the user's visual axis from positions of the characteristic points.

The photometry circuit 102 amplifies signals from the photometry sensor 10, subjects them to logarithmic compression and A/D conversion, and then transmits the signals as luminance information of each sensor element to CPU 100. The photometry sensor 10 consists of four photodiodes for metering the four areas, i.e., SPC-L for metering the left area 210 including the left focus-detecting areas 200, 201 in the finder view field, SPC-C for metering the center area 211 including the focus-detecting area 202, SPC-R for metering the right area 212 including the right focus-detecting areas 203, 204, and SPC-A for metering the peripheral area 213 around them, as shown in FIG. 3.

The line sensor 6f is a well-known CCD line sensor consisting of five line sensors CCD-L2, CCD-L1, CCD-C, CCD-R1, and CCD-R2 corresponding to the five focus-detecting areas 200 to 204 in the finder view field shown in FIG. 3 as described previously.

The automatic focusing point detection circuit 103 converts analog signals (voltages) obtained from the above line sensor 6f into digital signals and sends the digital signals to CPU 100.

SW1 is a switch which is turned on by a first stroke of a release button 41 to start photometry, AF, the operation of detecting the visual axis, etc., SW2 a release switch which is turned on by a second stroke of the release button, SW-AEL an AE lock switch which is turned on when an unrepresented AE lock button is pressed, and SW-DIAL1 and SW-DIAL2 are dial switches provided in an unrepresented electronic dial, signals from which are put into an up and down counter in the signal input circuit 104 to count an amount of rotation click of the electronic dial.

The LCD drive circuit 105 is constructed in the well-known structure for display-driving the in-finder LCD 24 and monitoring LCD 42, which can make the monitoring LCD 42 and in-finder LCD 24 both simultaneously display an indication of an aperture value, a shutter speed (time), a photographic mode selected, etc. in accordance with a signal from CPU 100.

The LED drive circuit 106 controls the illumination LED (F-LED) 25 and superimposition LED 21 to light or to flicker. The IRED drive circuit 107 selectively drives the infrared light emitting diodes (IREDs 1 to 6) 13a to 13f to light in accordance with circumstances.

The shutter control circuit 108 controls a magnet MG-1 for running a leading curtain upon energization and a magnet MG-2 for running a trailing curtain, so as to effect exposure with a predetermined light quantity on the photosensitive member. The motor control circuit 109 controls a motor M1 for winding or rewinding the film, and a motor M2 for charging the main mirror 2 and shutter 4.

The serial release sequence of the camera is operated by the shutter control circuit 108 and motor control circuit 109.

Figure 6:
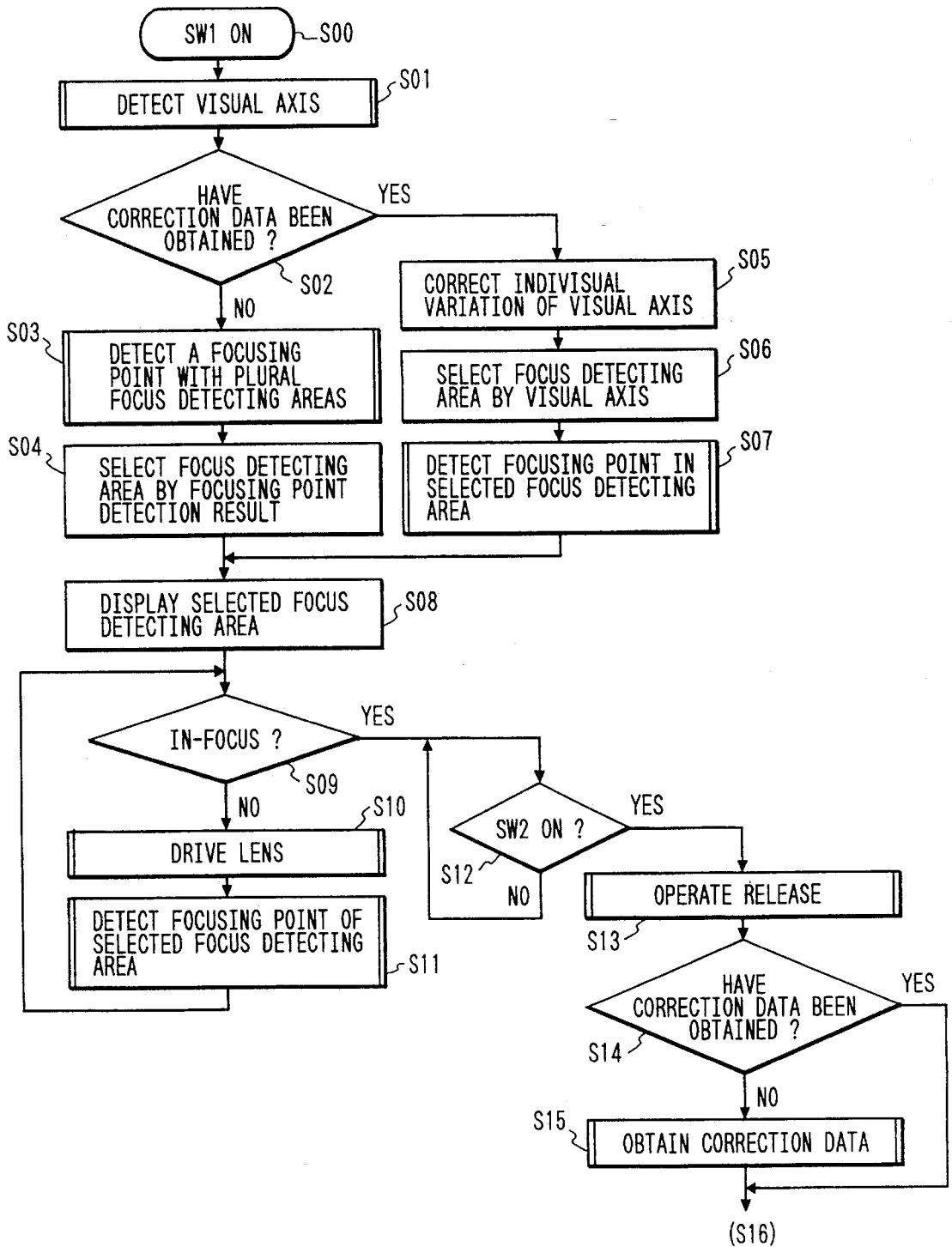
FIG. 6 is a flowchart to show the operation of the main part in the first embodiment of the present invention.

The operation of the single-lens reflex camera as so arranged is next described in accordance with the flowchart of FIG. 6. This flowchart shows the operation when the switch SW1 is turned on by the first stroke of the release button of the camera.

When the switch SW1 is turned on, the flow advances from step (S00) to step (S01), where the detection of the user's visual axis is executed. Specifically, the detection of visual axis is carried out as described previously, but the operation is processed here only up to the calculation of rotational angle of user's eyeball.

At next step (S02) it is determined whether the individual variation correction coefficients (data) A1, B1 has already been obtained.

This can be determined if the data A1, B1 has been obtained once in the past, or it can be determined as effective after a plurality of data has been obtained. In the latter case, most probable data A1, B1 is obtained by statistical processing such as averaging or the method of least squares from the plurality of data.

If the data has already been obtained, the flow proceeds from step (S02) to (S05) to calculate coordinates of the user's visual axis with effective correction data A1, B1, based on the previously described formula (5). Then, at the next step (S06), it is checked which coordinates of the focus-detecting area 200 to 204 in the finder are closest to the calculated coordinates of visual axis, and a closest focus-detecting area is selected. At the next step (S07), focusing point detection is carried out for the selected focus-detecting area to detect an amount of defocus of the focus-detecting area.

Also, if it is determined at the above step (S02) that the individual variation correction data A1, B1 have not been obtained yet, the flow proceeds to step (S03) to execute focusing point detection for all focus-detecting areas 200 to 204. Since the focusing point detection at a point by the visual axis is not possible with no effective correction data A1, B1, this operation is carried out for selecting a focus-detecting area, based on only the focus information. At next step (S04) a focus-detecting area is selected based on the focus information of the all focus-detecting areas. Specifically, a focus-detecting area may be selected according to the rule of giving the priority to an object closest to the camera, similarly in the case of the visual-axis detecting function being nonoperational. A focusing state of the thus selected focus-detecting area is a defocus amount for the lens to be driven.

After the defocus amount of the selected focus-detecting area is detected at the above step (S04) or (S07), the next step (S08) is carried out to light the selected focus-detecting area in a superimposed manner in the finder so as to let the user know the selected focus-detecting area. This indication is very effective, because if the selection of a focus-detecting area based on the visual axis were not made because of the absence of effective individual variation data, the selected focus-detecting area would be often discordant with the user's will.

Next steps (S09), (S10), (S11) are executed for focusing before the selected focus-detecting area becomes in focus.

After that, when the selected focus-detecting area is in focus, the flow proceeds from step (S09) to (S12) to check the state of switch SW2 which is arranged to be turned on with the second stroke of the release button. Unless it is turned on, the flow is kept in the loop including step (S12). Then, when it is turned on thereafter, the flow goes to step (S13) to perform the serial release operation here.

At the next step (S14), it is determined whether the correction data A1, B1 has already been obtained or not, similarly as at the above step (S02). If the data has not yet been obtained, the flow goes to step (S15) to obtain the individual variation data based on the visual-axis information detected at step (S01).

On this occasion, where the correction data is arranged to become effective after a plurality of data has been stored, the visual-axis data at this time may be used to statistically process the stored data and to update it.

If the correction data has already been obtained, the procedure of step (S15) is not executed and then the flow proceeds to an unrepresented operation after the step (S16) for performing processing after release. The description is omitted for the process after release, because it is not directly related to the present invention.

Figure 7A:
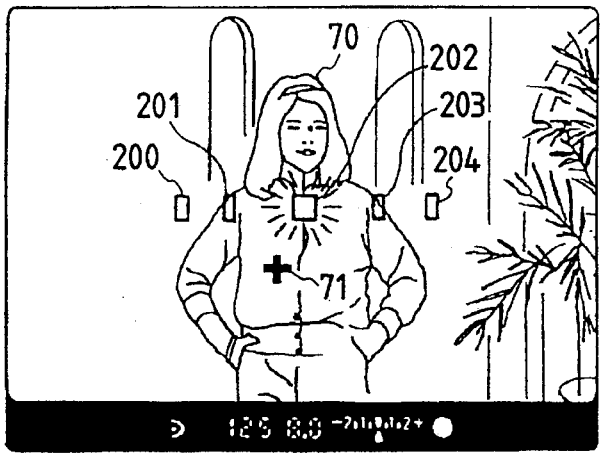
FIGS. 7A and 7B are drawings to illustrate a way of selecting a focus-detecting area in the first embodiment of the present invention.
Figure 7B:
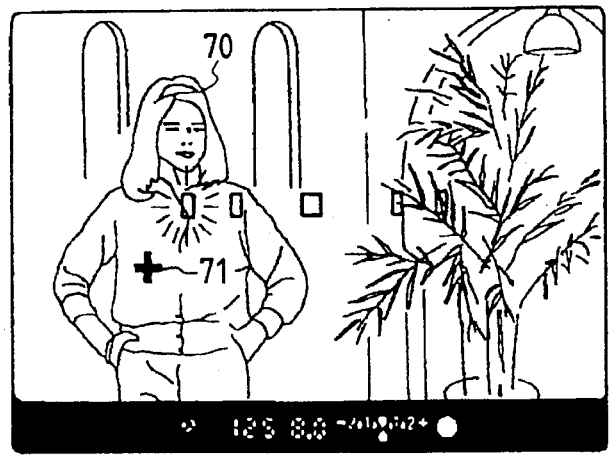

Here, the above operation is again described using FIGS. 7A and 7B.

When the individual variation correction data A1, B1 is not effective and if the selection of a focus-detecting area is carried out based on the focus information, it is normally selected based on the rule of priority on a closest object as described above. For example, if a main object 70 is located on the center focus-detecting area 202, as shown in FIG. 7A, selection of focus-detecting area 202 according to the rule of priority on the closest is the correct selection.

When the individual variation correction data A1, B1 is set to uncorrected values, "A1=1.0 and B1=0.0", the visual axis would be located at coordinates as represented by 71. The coordinates change depending upon the user. Thus, it can be said that the individual variation correction is an act to keep the visual-axis coordinates 71 coincident with the coordinates of the focus-detecting area 202 even with a change of user by properly setting the correction data A1, B1.

If focusing is completed in the focus-detecting area selected only by the focus information and if the release operation is started in that state, the user indicates his or her intention that the selected focus-detecting area is the intended point. In this case, the user must be looking at the object. Accordingly, if the user actuates the release as it is, it is considered that the focus-detecting area at that time is coincident with the visual axis and the correction data can be obtained based thereon.

The operation is the same for the case where the main object 70 is located at the left end of the screen, as shown in FIG. 7B. In this case, if the user actuates the release with a focus-detecting area selected based on the rule of priority on the closest, it is considered that the visual-axis coordinates 71 are originally coincident with the left end focus-detecting area. Unless the user starts the release, the selected region is not coincident with the user's intention and, therefore, acquirement of correction data is not carried out.

Figure 8:
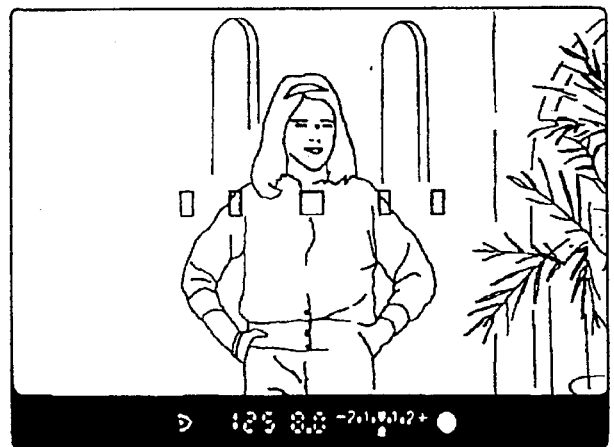
FIG. 8 is a drawing to illustrate a way of obtaining correction data of individual variations in the second embodiment of the present invention.

FIG. 8 and FIG. 9 are drawings concerning the second embodiment of the present invention. The structure of the camera is the same as in FIG. 4 and FIG. 5 and is omitted herein.

When the AE mode of the camera is set, for example, in "shutter priority," the camera of the present embodiment is so arranged that the shutter speed (time) can be changed by the unrepresented electronic dial. A value of the shutter time is displayed on a display portion 72 in the LCD 24 in finder, as shown in the FIG. 8.

Thus, the second embodiment is so arranged that, because it is understood that when the user changes the shutter time by his or her own will, the user must be looking at it, the individual variation data is obtained based on the visual-axis information at that time.

The operation in the second embodiment is described in accordance with the flowchart of FIG. 9.

If the AE mode is set in "shutter priority," the flow goes through step (S20) to step (S21), where the state of switch SW1, which is arranged to be turned on by the first stroke of the release button, is checked. If it is turned on, the flow goes to step (S22) to execute the flow as described in the first embodiment.

Also, if the switch SW1 is not turned on, the flow goes from step (S21) to (S23) to detect an input into the unrepresented electronic dial. Without any input into dial the flow returns to step (S21). With an input the flow goes to step (S24) to indicate a shutter time on the display portion 72 in the in-finder LCD 24, and then at the next step (S25) setting of the shutter time is actually changed. Then, at the next step (S26) the visual axis detection is carried out and at subsequent steps (S27), (S28) acquirement of individual variation correction data A1, B1 is executed similarly as in the first embodiment.

This example showed acquirement of data as to the shutter time, but the present invention is not limited to the shutter time. Any indication which can be set by the user of the camera by its own will, for example, an indication such as an aperture value, an exposure correction value, a flash device charge completion, etc., can also be similarly employed for obtaining the individual variation correction data.

Since the above embodiments are so arranged that the correction data is obtained during the ordinary operation of the camera for visual-axis detection, the operability can be greatly improved without forcing the user to perform the troublesome operation of "calibration."

The above embodiments showed only the method for obtaining the correction data during the ordinary operation of the camera, but it is apparent that this may be combined with the conventional "calibration" operation.

If the individual variation correction data for a plurality of users needs to be stored, initializing means for initializing the stored data and selecting means for allowing selection of data from stored data may be added similarly in the case of the conventional "calibration" operation.

What is claimed is:

1. A camera comprising:

a finder having a view field;

detecting means for detecting a distribution of intensity of light from an eye of a photographer; and a controlling device comprising calculating means for calculating a direction of a visual axis by using an output of said detecting means and correction data, for controlling said camera based on the direction of the visual axis calculated by said calculating means;

said controlling device automatically forming the correction data by using an output of said detecting means during a phototaking operation.

2. A camera according to claim 1, wherein said controlling device forms the correction data by using a signal outputted from said detecting means while the eye is viewing a predetermined portion in said view field.

3. A camera according to claim 2, wherein said predetermined portion is directed to a portion where a mark indicating a focusing point detecting position is provided.

4. A camera according to claim 3, wherein said controlling device responds to an operation that a shutter button has been pushed to form the correction data.

5. A camera according to claim 2, wherein said predetermined portion is directed to a portion for displaying numerical values relating to a phototaking condition.

6. A camera according to claim 2, wherein said predetermined portion is directed to a portion where a mark indicating a state of charge of a strobe is provided.

* * * * *

UNITED STATES PATENT AND TRADEMARK OFFICE
CERTIFICATE OF CORRECTION

PATENT NO. : 5,576,796
DATED : November 19, 1996
INVENTOR(S) : AKIRA AKASHI

It is certified that error appears in the above-indentified patent and that said Letters Patent is hereby corrected as shown below:

COLUMN 2

Line 51, "and-when" should read --and - when-- (minus sign).

Signed and Sealed this

Eighth Day of April, 1997

Attest:

BRUCE LEHMAN

*Attesting Officer*    Commissioner of Patents and Trademarks